(12) United States Patent
Capstran

(10) Patent No.: US 6,729,034 B1
(45) Date of Patent: May 4, 2004

(54) ROUTER TOOL GUIDES

(76) Inventor: Richard E. Capstran, 1741 Alta Vista Ave., Milwaukee, WI (US) 53213

( * ) Notice: Subject to any disclaimer, the term of this patent is extended or adjusted under 35 U.S.C. 154(b) by 0 days.

(21) Appl. No.: 10/290,947

(22) Filed: Nov. 8, 2002

(51) Int. Cl.$^7$ ................................................ G01B 3/14
(52) U.S. Cl. .................... 33/528; 33/562; 33/DIG. 10
(58) Field of Search ....................... 33/528, 562, 555.2, 33/563, 565, 566, DIG. 10

(56) References Cited

U.S. PATENT DOCUMENTS

| | | | |
|---|---|---|---|
| 3,884,280 A | * 5/1975 | Chailer | 33/DIG. 10 |
| 4,230,164 A | * 10/1980 | Mericle | 33/562 |
| 4,332,066 A | * 6/1982 | Hailey et al. | 33/562 |
| 5,222,303 A | * 6/1993 | Jardine | 33/528 |
| 5,615,490 A | * 4/1997 | Burchell | 33/528 |
| 5,813,130 A | * 9/1998 | MacDowell | 33/528 |

FOREIGN PATENT DOCUMENTS

GB    2248035 A  *  3/1992  ............ B25H/7/02

* cited by examiner

Primary Examiner—Christopher W. Fulton
(74) Attorney, Agent, or Firm—Donald J. Ersler

(57) ABSTRACT

A perimeter router guide preferably includes a guide area and a support leg. The support leg extends from a bottom of the guide area. A retention opening is formed adjacent the guide area to facilitate attachment of a work surface with a fastener. A circular router guide includes a pivot plate and a guide tube. The guide tube extend from a collet end of a router tool. The pivot plate preferabbly includes a plate with a plurality of bosses extending from a face of the plate. A pilot hole is formed through each boss. The pilot hole is sized to receive the guide tube. The plate is pivotally attached to a surface to be cut. The guide tube is inserted into one of the pilot holes and revolved relative to the pivot point of the pivot plate.

17 Claims, 4 Drawing Sheets

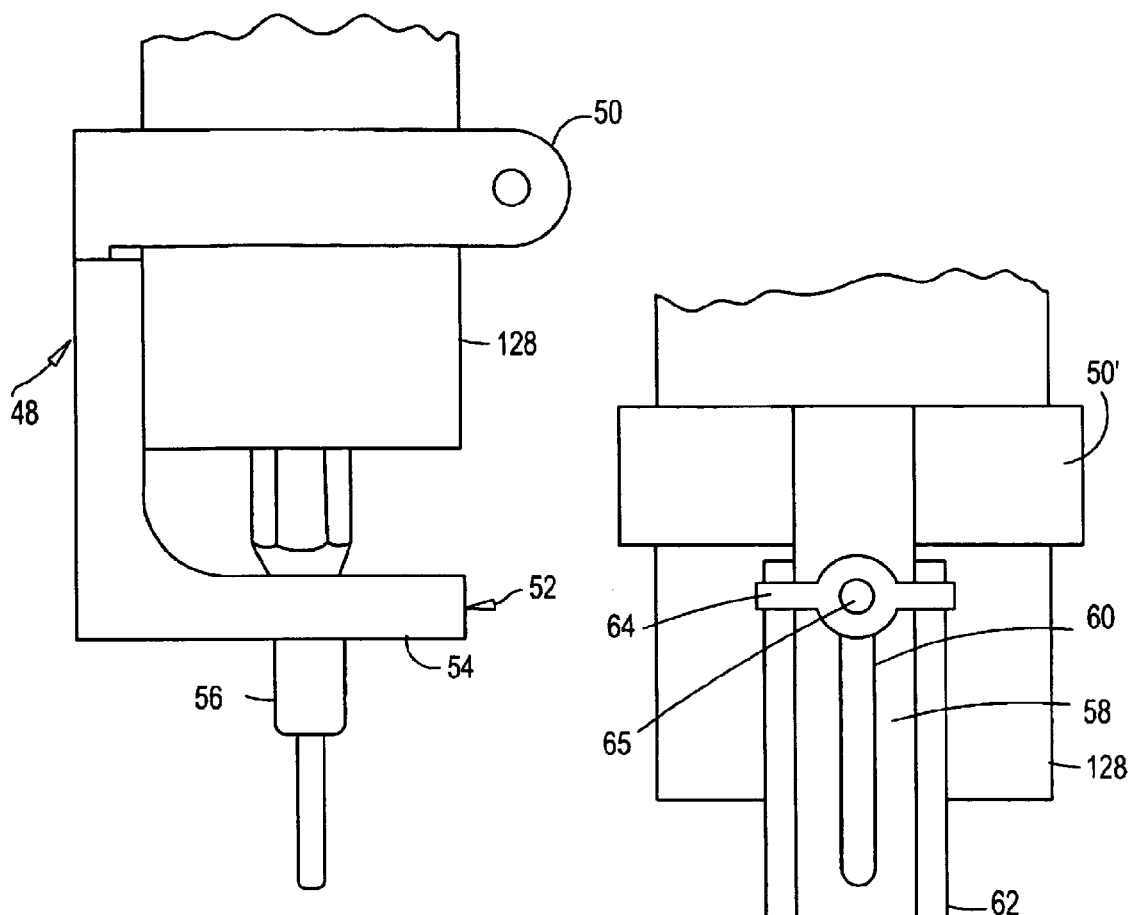
FIG. 8
FIG. 10
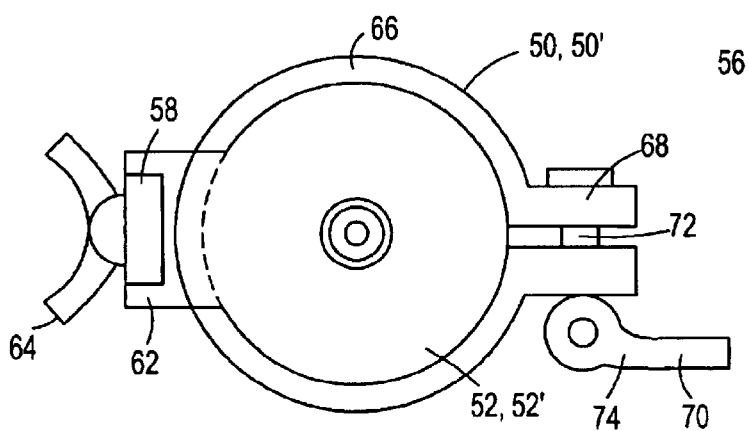
FIG. 9

US 6,729,034 B1

ROUTER TOOL GUIDES

BACKGROUND OF THE INVENTION

1. Field of the Invention

The present invention relates generally to router tools and more specifically to router tool guides, which enable a router tool to be guided to form a geometric shape.

2. Discussion of the Prior Art

There are numerous router guides in the art. However, it appears that none of these router guides disclose forming a plurality of different circles therewith. Further, it appears no router tool guide exist, which may be used to form an opening for an electrical box in a wall.

Accordingly, there is a clearly felt need in the art for a. router tool guides, which enables a plurality of different sized circles to be formed in a surface or an opening for an electrical box in a surface.

SUMMARY OF THE INVENTION

The present invention provides router tool guides, which enable different geometric shapes to be formed in a surface. A perimeter router guide preferably includes a guide and a support leg. The support leg extends from a bottom of the guide. A retention opening is preferably formed adjacent the guide. A fastener is preferably inserted through the retention opening and fastened to a work surface to retain the perimeter router guide. A user then uses an inner perimeter of the guide as a reference to guide a cutting tool of a router tool to form a geometric shape in the work surface.

A circular router guide includes a pivot plate and a pilot tube. The pilot tube includes a guide tube and a stop disc. A first end of the guide tube is preferably flared inward and the second end of the guide tube is flared outward. The stop disc is formed on substantially a middle of the guide tube. An outer perimeter of the pilot tube is sized to be received by a retainer cap of a router tool. The flared end of the pilot tube is retained in the retainer cap. The pivot plate preferably includes a plate with a plurality of pilot bosses extending from a face of the plate. A pilot hole is formed through each pilot boss. The pilot hole is sized to receive the outer perimeter of the pilot tube. A pivot opening is formed in substantially a center of the plate. The pivot plate may be pivotally attached to the work surface by inserting a threaded fastener, a nail, or any other suitable device through the pivot opening into the work surface.

A second embodiment of the circular router guide includes the pivot plate and a pilot attachment adapter. The pilot attachment adapter preferably includes an attachment member and a pilot base. The pilot base includes a support platform and a guide tube extending from the support platform. The pilot base may be rigidly or slidably secured to the attachment member. The attachment member is attached to a body of the router tool. The guide tube for either router guide is inserted into one of the pilot holes of the pivot plate and revolved relative to the pivot point of the pivot plate to create a circular opening.

Accordingly, it is an object of the present invention to provide a perimeter router guide, which is used to guide a router tool to form a geometric opening in a work surface.

Finally, it is another object of the present invention to provide a circular router guide, which may be used to form a plurality of different size diameters in a work surface.

These and additional objects, advantages, features and benefits of the present invention will become apparent from the following specification.

BRIEF DESCRIPTION OF THE DRAWINGS

FIG. 8 is a front view of a second embodiment of a circular router guide in accordance with the present invention.

FIG. 9 is an end view of a second embodiment of a circular router guide in accordance with the present invention.

FIG. 10 is a side view of a second embodiment of a circular router guide with an adjustable connection between an attachment member and a pilot base.

DETAILED DESCRIPTION OF THE PREFERRED EMBODIMENTS

Figure 1:
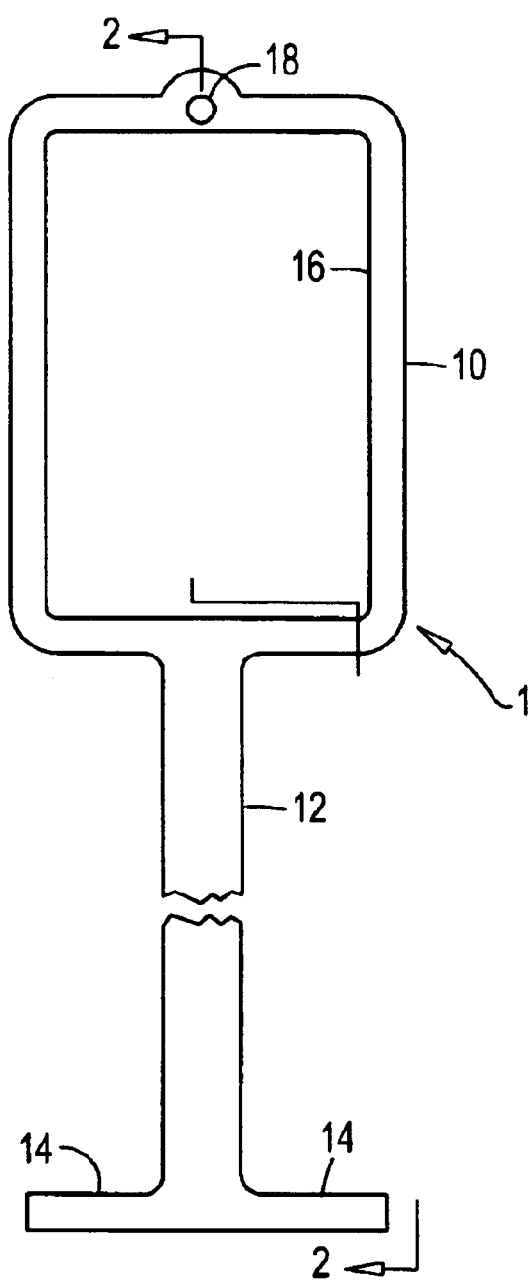
FIG. 1 is a front view of a perimeter routing guide in accordance with the present invention.
Figure 2:
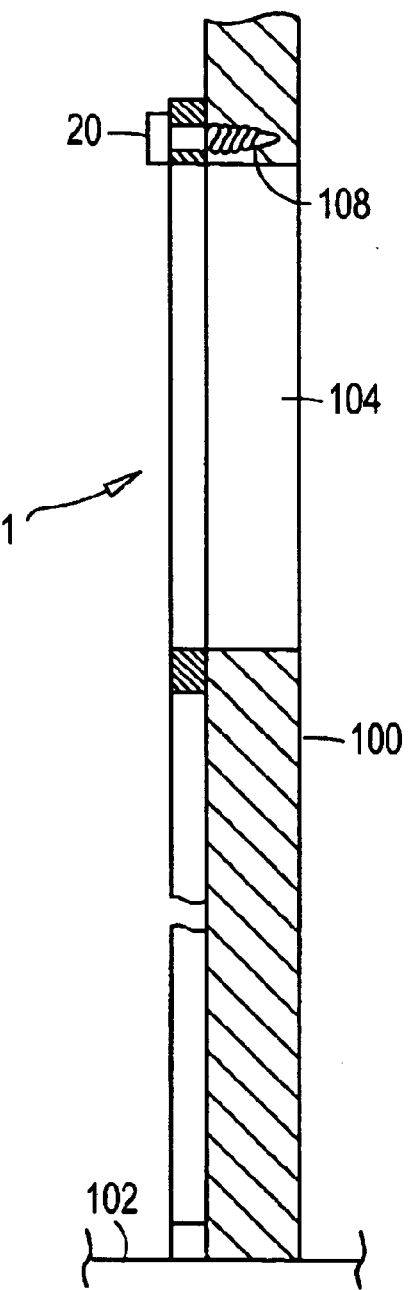
FIG. 2 is a partial side cross sectional view of a perimeter routing guide in accordance with the present invention.

With reference now to the drawings, and particularly to FIG. 1, there is shown a front view of a perimeter routing guide 1. With reference to FIG. 2, the perimeter routing guide 1 includes a guide 10 and a support leg 12. The support leg 12 extends from a bottom of the guide 10 at substantially a middle thereof. At least one foot 14 preferably extends from a bottom of the support leg 12. The support leg 12 may have any appropriate length. An inner perimeter 16 is formed inside the guide 10 to provide a guided contour for forming an opening in a work surface 100, such as a wall. A retention opening 18 is preferably formed adjacent the guide 10 on a top thereof at substantially a middle thereof. A fastener 20 such as a self-tapping screw, nail or other suitable fastener is preferably inserted through the retention opening 18 and fastened to the work surface 100 to retain the perimeter router guide 1.

Figure 3:
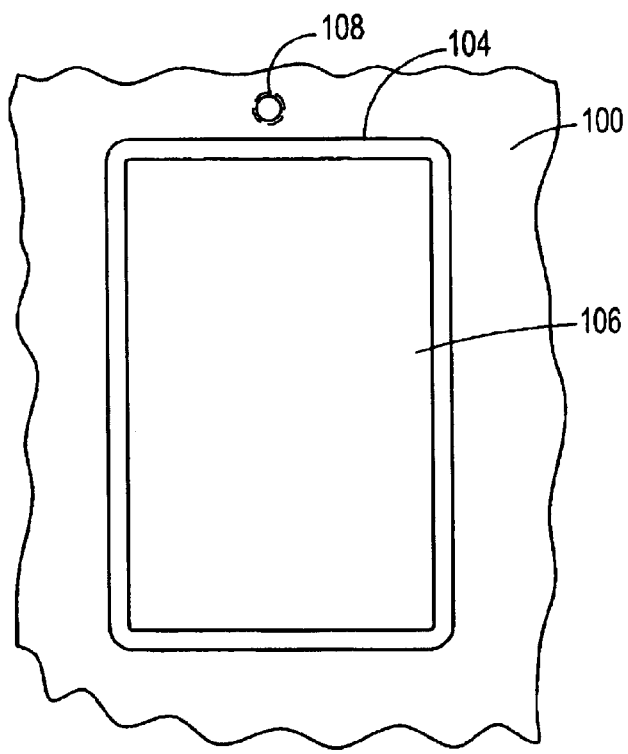
FIG. 3 is a front view of a work surface after a geometric shape has been cut-out with a router tool utilizing a perimeter router guide in accordance with the present invention.

A user places the perimeter router guide 1 on a support surface 102 and laterally moves the perimeter router guide 1, until thereof is aligned with the opening to be formed in the work surface 100. A user guides the router bit, such that thereof contacts the inner perimeter 16 as an opening 104 is formed in the work surface 100. A substantially rectangular shaped inner perimeter 16 is shown, however the inner perimeter may have other geometric shapes, such a circle or a irregular contour. FIG. 3 shows a work surface 100 after a router bit has cut the opening 104. A slug 106 is formed from the router bit. A fastener hole 108 also remains from attaching the perimeter router guide 1 to the work surface 100.

Figure 4:
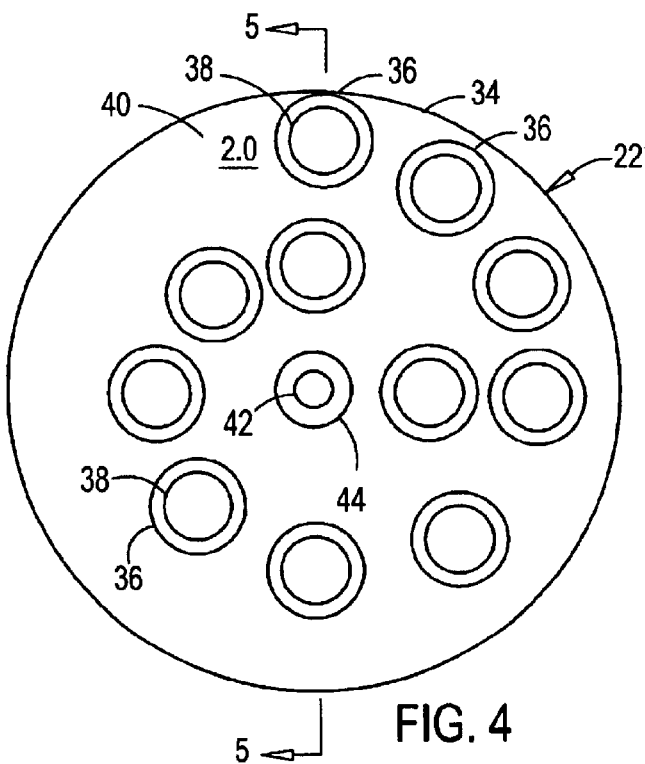
FIG. 4 is a rear view of a pivot plate of a circular router guide in accordance with the present invention.
Figure 5:
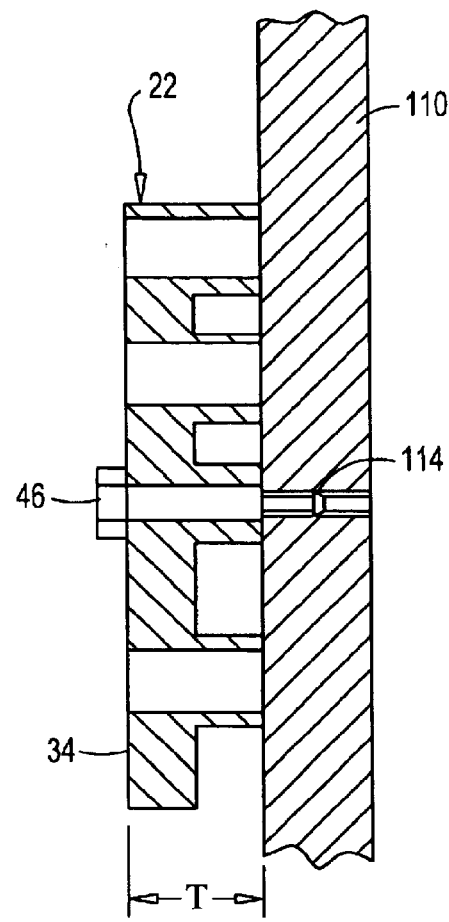
FIG. 5 is a side cross sectional view of a pivot plate pivotally attached to a work surface in accordance with the present invention.
Figure 6:
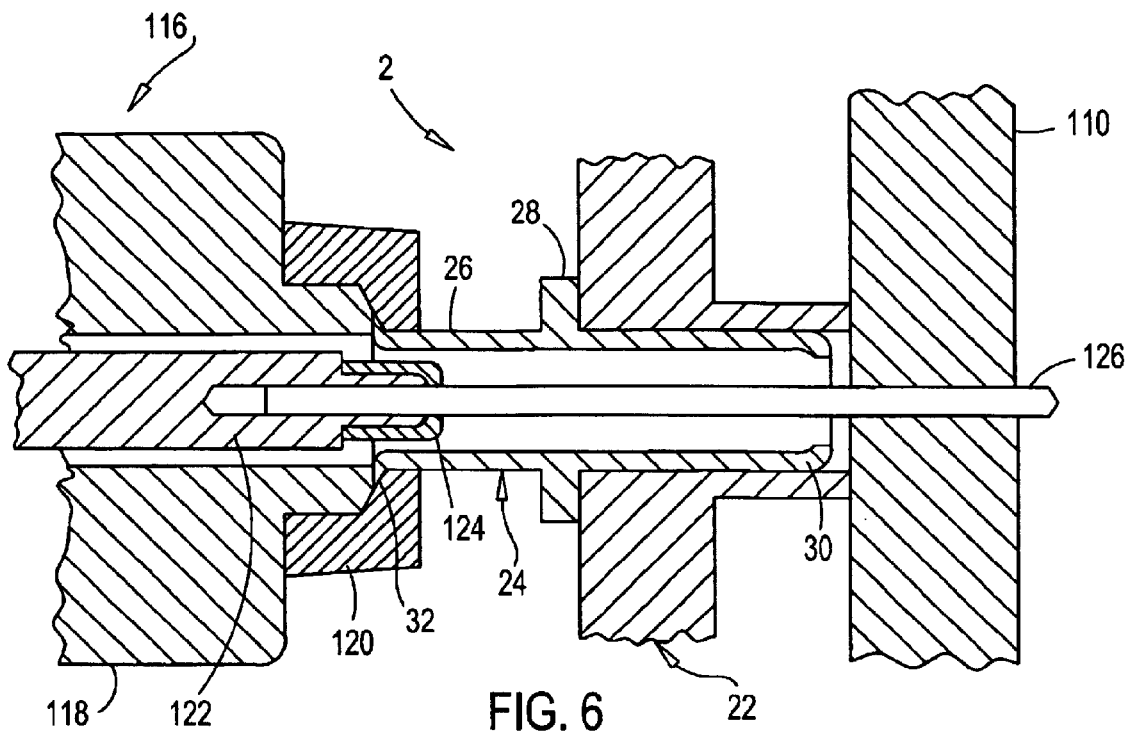
FIG. 6 is an enlarged cross sectional view of a router tool retained in a circular router guide in accordance with the present invention.

With reference to FIGS. 4–6, a circular router guide 2 includes a pivot plate 22 and a pilot tube 24. The pilot tube 24 includes a guide tube 26 and a stop disc 28. The stop disc 28 is formed on substantially a middle of the guide tube 26.

A first end 30 of the guide tube 26 is preferably flared inward and a second end 32 of the guide tube 26 is flared outward. An outer perimeter of the guide tube 26 is sized to be received by a retainer cap 120 of a router tool. A router tool 116 includes a body 118, the retainer cap 120, a collet shaft 122, a collet nut 124, and a router bit 126. The flared second end 32 of the guide tube 26 is retained in the retainer cap 120. The retainer cap 120 is threadably attached to an end of the body 118. The router bit 126 is retained in the collet shaft 122 by tightening the collet nut 124.

The pivot plate 22 preferably includes a plate 34 with a plurality of pilot bosses 36 extending from a face of the plate 34. The pivot plate 22 may also be fabricated without the plurality of pilot bosses 36 by providing a plate 34 with a thickness "T." The plurality of pilot bosses 36 of the pivot plate 22 makes manufacture by molding or casting more efficient. The plurality of pilot bosses 36 are preferably arranged in a spiral to accommodate a maximum number thereof. However, other patterns besides a spiral may also be used. A pilot hole 38 is formed through each pilot boss 36. The pilot hole 38 is sized to receive the outer perimeter of the guide tube 26. A circle size 40 generated by rotation of the pivot plate 22 is preferably shown adjacent each pilot boss 36. The circle size 40 describes the circle created by a router bit, after the pivot plate 22 is rotated 360 degrees.

Figure 7:
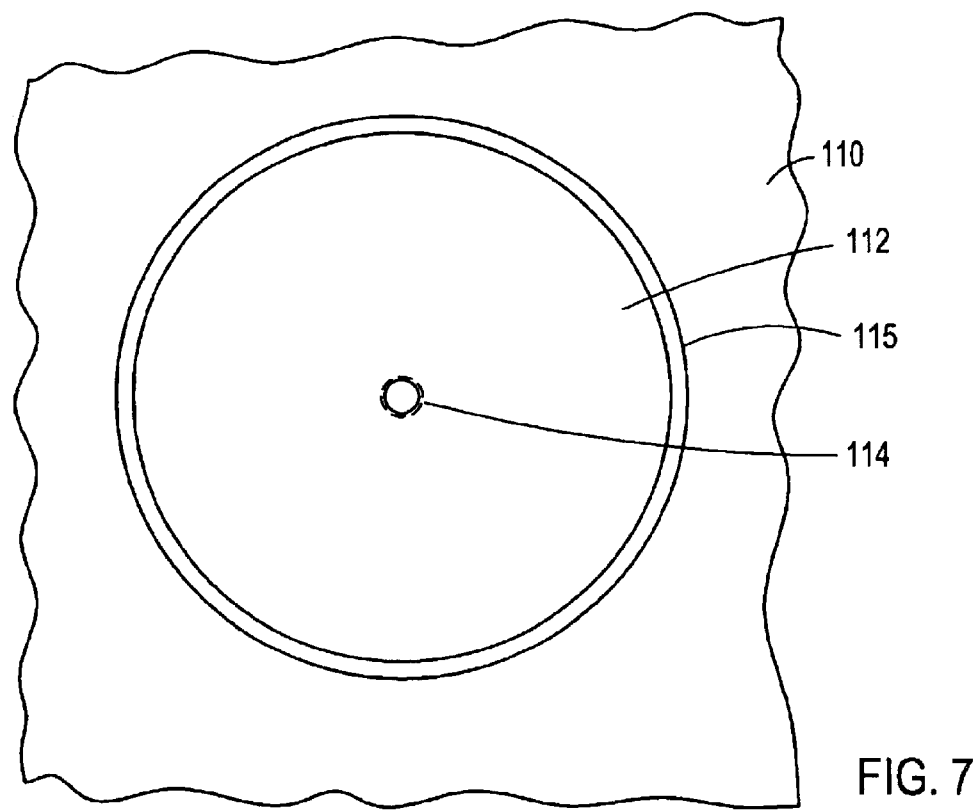
FIG. 7 is a front view of a work surface after a circle has been cut-out with a router tool and a circular router guide in accordance with the present invention.

A pivot opening 42 is formed in substantially a center of the plate 34. Each pilot hole 38 is preferably formed a different distance from the pivot opening 42. A pivot boss 44 is preferably formed around the pivot opening 42. The pivot plate 22 is shown with the pivot and pilot bosses contacting the work surface 110, but a front of the pivot plate 22 may also contact the work surface 110 instead of the rear. The pivot plate 22 is pivotally attached to the work surface 110 by inserting a threaded fastener 46, a nail, or other suitable retention device through the pivot opening 42. FIG. 7 shows a work surface 110 after a router bit has cut the opening 115. A slug 112 is formed from the router bit. A fastener hole 114 also remains from attaching the circular router guide 2 to the work surface 110.

With reference to FIGS. 8 & 9, a second embodiment of the circular router guide includes the pivot plate 22 and a pilot attachment adapter 48. The pilot attachment adapter 48 preferably includes an attachment member 50 and a pilot base 52. The pilot base 52 includes a support platform 54 and a guide tube 56 extending from the support platform 54. The pilot base 52 may be rigidly or slidably attached to the attachment member 50. FIG. 10 illustrates a pilot base 52' slidably attached to an attachment member 50'. A tongue 58 extends from the attachment member 50'. A slot 60 is formed in substantially the length of the tongue 58. A tongue retainer 62 extends from the pilot base 52' to slidably receive the tongue 58. A nut 64 is tightened on a bolt 65 to retain the attachment member 50 immoveable relative to the pilot base 52'. The bolt 65 is retained in the tongue retainer 62.

The attachment member 50, 50' is attached to a body of the router tool 128.

The attachment member 50, 50' preferably includes a split ring 66, a pair tightening flanges 68 and cam lever lock 70. A single tightening flange 68 extends from one side of the split ring 66. The cam lever lock 70 includes a bolt 72 and a lock lever 74. One end of the bolt 72 is retained by:one of the tightening flanges 68 and the lock lever 74 is pivotally attached to the other end of the bolt 72. Pivoting of the lock lever 74 draws the pair of flanges 68 together to tighten the attachment member 50, 50' on the body of the router tool 128. However, other methods of securing the attachment member 50, 50' to the body of the router tool 128 may also be used.

The guide tube 26, 56 is inserted into one of the pilot holes 38 of the pivot plate 22 and the router tool 116, 128 is revolved relative to the pivot point of the pivot plate 22 to create a circular opening.

While particular embodiments of the invention have been shown and described, it will be obvious' to those skilled in the art that changes and modifications may be :made without departing from the invention in its broader aspects, and therefore, the aim in the appended claims is to cover all such changes and modifications as fall within the true spirit and scope of the invention.

I claim:

1. A method of forming a geometric shape in a work surface with a router tool comprising the steps of:

providing said router tool with a router bit;

providing a pivot plate having a plurality of pilot holes;

attaching pivotally said pivot plate to the work surface;

retaining a guide tube around said router bit;

inserting a first end of said guide tube into one of said plurality of pilot holes; and rotating said pivot plate to form a geometric shape in the work surface.

2. The method of forming a geometric shape in a work surface with a router tool of claim 1, further comprising the stop of:

securing a second end of said guide tube to an end of said router tool.

3. The method of forming a geometric shape in a work surface with a router tool of claim 2, further comprising the step of:

forming a stop disc around said guide tube, said stop disc controlling the insertion depth of said guide tube.

4. The method of forming a geometric shape in a work surface with a router tool of claim 2, further comprising the step of:

forming an outward flared end on said second of said pilot tube.

5. The method of forming a geometric shape in a work surface with a router tool of claim 1, further comprising the step of:

forming each one of said plurality of pilot holes a different distance from a pivot point of said pivot plate.

6. The method of forming a geometric shape in a work surface with a router tool of claim 1, further comprising the step of:

arranging said plurality of pilot holes in a spiral.

7. The method of forming a geometric shape in a work surface with a router tool of claim 1, further comprising the step of:

forming a pilot boss around each one of said plurality of pilot holes.

8. The method of forming a geometric shape in a work surface with a router tool of claim 1, further comprising the step of:

attaching pivotally said pivot plate to the work surface with a threaded fastener.

9. The method of forming a geometric shape in a work surface with a router tool of claim 1, further comprising the step of:

providing a pilot attachment adapter with said guide tube extending therefrom, said pilot attachment adapter being secured to a body of said router tool.

10. The method of forming a geometric shape in a work surface with a router tool of claim 9, further comprising the step of:

said pilot attachment adapter including an attachment member and a pilot base, said attachment member being secured to said body of said router tool, said pilot base being adjustable secured to said attachment member, said guide tube extending from said pilot base.

11. A method of forming a geometric shape in a work surface with a router tool comprising the steps of:

providing said router tool with a router bit;

providing a pivot plate having a plurality of pilot holes;

attaching pivotally said pivot plate to the work surface;

retaining a guide tube around said router bit;

inserting a first end of said guide tube into one of said plurality of pilot holes;

securing a second end of said guide tube to an end of said router tool; and rotating said pivot plate to form a geometric shape in the work surface.

12. The method of forming a geometric shape in a work surface with a router tool of claim 11, further comprising the step of:

forming a stop disc around said guide tube, said stop disc controlling the insertion depth of said guide tube.

13. The method of forming a geometric shape in a work surface with a router tool of claim 11, further comprising the step of:

forming an outward flared end on said second of said pilot tube.

14. The method of forming a geometric shape in a work surface with a router tool of claim 11, further comprising the step of:

forming each one of said plurality of pilot holes a different distance from a pivot point of said pivot plate.

15. The method of forming a geometric shape in a work surface with a router tool of claim 11, further comprising the step of:

arranging said plurality of pilot holes in a spiral.

16. The method of forming a geometric shape in a work surface with a router tool of claim 11, further comprising the step of:

forming a pilot boss around each one of said plurality of pilot holes.

17. The method of forming a geometric shape in a work surface with a router tool of claim 11, further comprising the step of:

attaching pivotally said pivot plate to the work surface with a threaded fastener.

* * * * *